United States Patent [19]

Suzuki et al.

[11] 4,409,852
[45] Oct. 18, 1983

[54] METHOD OF MEASURING STRETCH OF CONVEYOR BELT

[75] Inventors: Isao Suzuki; Haruyuki Serikawa, both of Yokohama, Japan

[73] Assignee: Bridgestone Tire Company Limited, Tokyo, Japan

[21] Appl. No.: 300,068

[22] Filed: Sep. 8, 1981

[30] Foreign Application Priority Data

Sep. 8, 1980 [JP] Japan ............................... 55-124214

[51] Int. Cl.³ .............................................. G01L 5/10
[52] U.S. Cl. ................................... 73/862.39; 73/159
[58] Field of Search ................... 73/862.39, 159, 82 G; 33/127; 324/206

[56] References Cited

U.S. PATENT DOCUMENTS

| | | | |
|---|---|---|---|
| 2,989,690 | 6/1961 | Cook | 73/159 X |
| 3,589,178 | 6/1971 | Germann | 73/862.34 |
| 3,873,912 | 3/1975 | Mori et al. | 324/206 |

FOREIGN PATENT DOCUMENTS 914819  1/1963  United Kingdom ............. 73/862.39

*Primary Examiner*—Charles A. Ruehl
*Attorney, Agent, or Firm*—Parkhurst and Oliff

[57] ABSTRACT

A method of measuring the stretch of a conveyor belt, wherein opposite ends of a belt having embedded therein steel cord cores in the longitudinal direction thereof are joined to each other, including: previously providing magnetic marks at two positions spaced apart a given distance from each other and interposing a joint of the steel cord cores of the conveyor belt therebetween; disposing two magnetic sensors spaced a given distance apart from each other in the running direction of the conveyor belt, in adjacent but non-contacting relation to the conveyor belt; detecting a period of time during which either one of the two magnetic marks moves across the two magnetic sensors during running of the conveyor belt and measuring the running speed of the conveyor belt based on the period of time and a distance across the two magnetic sensors; detecting also during running of the conveyor belt a time at which one of the magnetic marks in front in the running direction of the conveyor belt reaches one of the magnetic sensors in front in the running direction of the conveyor belt and a time at which the other of the magnetic marks in the rear in the running direction of the conveyor belt reaches the other of the magnetic sensors in the rear in the running direction of the conveyor belt and measuring a difference in time therebetween; and calculating the value of the stretch between the magnetic marks of the conveyor belt based on the measured running speed of the conveyor belt, the measured difference in time, a ratio between the distance across the magnetic marks and the distance across the magnetic sensors.

3 Claims, 7 Drawing Figures

METHOD OF MEASURING STRETCH OF CONVEYOR BELT

BACKGROUND OF THE INVENTION

This invention relates to method of measuring the stretch of conveyor belt, and particularly to a method of measuring the value of the stretch in a joint of a conveyor belt, in which opposite end portions of the belt having embedded therein steel cord cores in the longitudinal direction thereof are joined to each other to provide an endless belt.

Conveyor belts have been widely used in which opposite end portions of the belt have embedded therein steel cord cores joined to each other to provide an endless belt. The joint of the conveyor belt of the type described has been of such an arrangement steel cord cores exposed from opposite end portions of the belt are overlapping alternated with each other. Thereafter, a rubbery material is filled in the portion, where the steel cord cores are exposed and vulcanized for bonding, thereby joining the opposite end portions of the conveyor belt to each other. The endless conveyor belt thus formed has the forward and rear end portions wound around rotary driving members and is driven thereby, so that the conveyor belt is subjected to opposite tensile forces which cause the aforesaid joint to be pulled in directions tending to disconnect it.

When the tensile forces are applied to the joint, the steel cord cores at the respective end portions of the conveyor belt in the joint are pulled in directions opposite to each other. Because of this, if the conveyor belt is used for a long period of time, stretch occurs in the joint and, depending upon the conditions of use, it is possible for the tip ends of the steel cord cores to break through the rubber layer and project therefrom, and for the joint to be disjoined, thereby breaking the conveyor belt down. Consequently, it is necessary to constantly monitor the progress of the stretch in the joint of the conveyor belt.

Heretofore, the prior art methods of monitoring the progress of the stretch in the joint of the conveyor belt have been such methods that rely on a visual inspection for external flaws and the value of wear of the rubber, to infer the internal conditions of the joint. In other prior art methods, marks are provided at two points interposing the joint therebetween, the distance across the two marks is periodically measured and the progress of the stretch in the joint is ascertained through variation in the aforesaid distance.

Nevertheless, the conventional methods of measuring the stretch in the joint of the conveyor belt as described above present disadvantages, in that the operation of the conveyor line should be interrupted everytime the measurement is performed, thereby requiring large amounts of labor, and resulting in decreased production efficiency. Further, in the methods described above, the measuring work principally relies upon visual inspection, thus presenting disadvantages stemming from the wide dispersions in pass-fail judging made by the measurers. Consequently, accuracies in measurement are rather low.

SUMMARY OF THE INVENTION

The present invention has developed to obviate the above described disadvantages of the prior art, and has as its object the provision of a method capable of measuring the value of the stretch in a joint of a conveyor belt at any desired time automatically with high accuracy, even when the conveyor is running.

According to the present invention, magnetic marks previously provided at two positions spaced a given distance apart from each other on steel cord cores in the running direction of the conveyor belt on either side of the joint are detected by two magnetic sensors, whereby the value of the stretch in the joint of a conveyor belt is electrically calculated based on the periods of time between which the respective magnetic marks pass the respective magnetic sensors.

More specifically, the present invention can include a method of measuring the stretch of a conveyor belt, wherein opposite ends of a belt having embedded therein steel cord cores in the longitudinal direction thereof are joined to each other, including: previously providing magnetic marks at two positions spaced apart a given distance from each other and interposing a joint of the steel cord cores of the conveyor belt therebetween; disposing two magnetic sensors spaced a given distance apart from each other in the running direction of the conveyor belt, in adjacent but non-contacting relation with the conveyor belt; detecting a period of time during which either one of the two magnetic marks moves across the two magnetic sensors during operation of the conveyor belt and measuring the running speed of the conveyor belt based on the period of time and a distance across the two magnetic sensors; detecting also during operation of the conveyor belt a time at which one of the magnetic marks in front in the running direction of the conveyor belt reaches one of the magnetic sensors in front in the running direction of the conveyor belt and a time at which the other of magnetic marks in the rear in the running direction of the conveyor belt reaches the other of the magnetic sensors in the rear in the running direction of the conveyor belt and measuring the difference in time therebetween; and calculating the value of the stretch between the magnetic marks of the conveyor belt based on the measured running speed of the cnveyor belt, the measured difference in time, a ratio between the distance across the magnetic marks and the distance across the magnetic sensors.

With the abovedescribed arrangement of the present invention, the passages of the two magnetic marks provided on the steel cord cores in the conveyor belt can be detected by means of two magnetic sensors to electrically calculate the stretch of the conveyor belt, so that even during the operation of the conveyor belt the value of the stretch in the joint (the portion in which the stretch normally tends to occur most often) can be measured automatically with a high degree of accuracy.

With the above described arrangement, if the distance across the two magnetic marks is selected as identical with the distance across the two magnetic sensors, then the operation circuit for calculating the stretch can be simplified in construction.

Further, with the abovedescribed arrangement, in detecting the passages of the two magnetic marks by means of two magnetic sensors if detection signals of the magnetic marks are Fourier-transformed and differentially operated in an operation circuit to measure the center positions of the respective magnetic marks, whereby the positions of the respective magnetic marks are determined based on these center positions, then the stretch of the conveyor belt can be measured with high accuracy regardless of whether the width of magnetization in which the magnetic marks are provided on the steel cord cores is large or small.

DETAILED DESCRIPTION OF THE PREFERRED EMBODIMENTS

Description will hereunder be given of the preferred embodiments of the present invention with reference to the accompanying drawings.

Figure 1:
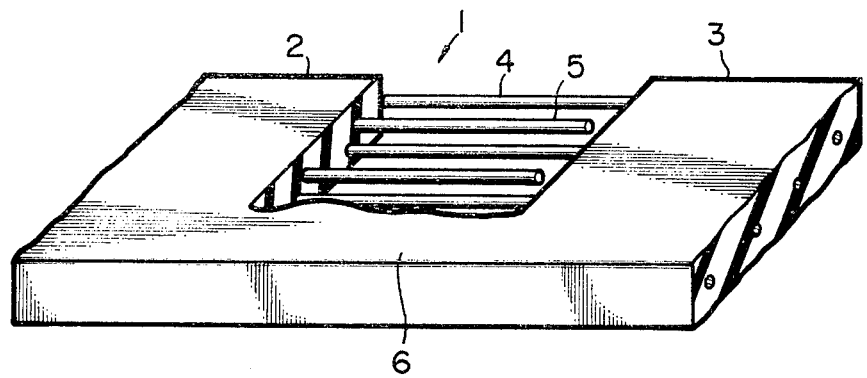
FIG. 1 is a perspective view, partly sectional, showing an example of a construction of the joint of the conveyor belt to which the present invention is applicable.

Firstly, referring to FIG. 1, an example of the internal structure of a joint of the conveyor belt will be described.

Designated at 1 is a joint of the conveyor belt, which is of such an arrangement that steel cord cores 4 and 5 exposed from opposite end portions 2 and 3 of the conveyor belt are overlappingly alternated with each other. Thereafter a rubber cover 6 is filled in a portion where the steel cord cores are exposed, and vulcanized for bonding, thereby joining the opposite end portions of the conveyor belt to each other. The now endless conveyor belt is supported at opposite ends on a rotary driving body for running, whereby the conveyor belt is subjected to tensile forces in opposite directions. Because of this, the joint is subjected to tensile forces and the steel cord cores 4 and 5 are pulled in directions opposite to each other.

Figure 2:
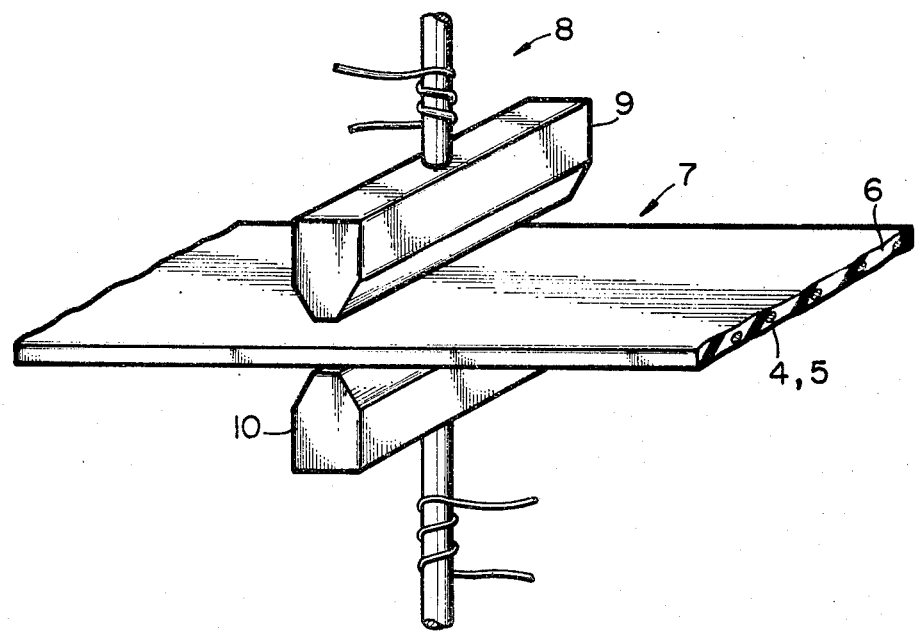
FIG. 2 is a perspective view showing an example of the magnetizer used in connection with the present invention.
Figure 3A:
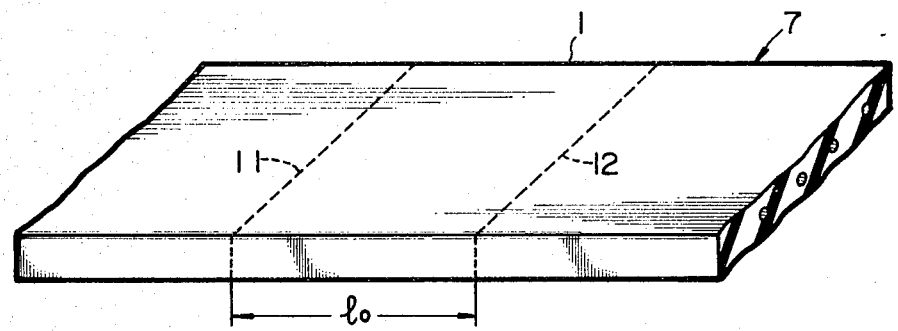
FIG. 3A is a perspective view showing examples of the joint of the conveyor belt and the magnetic marks.
Figure 3B:
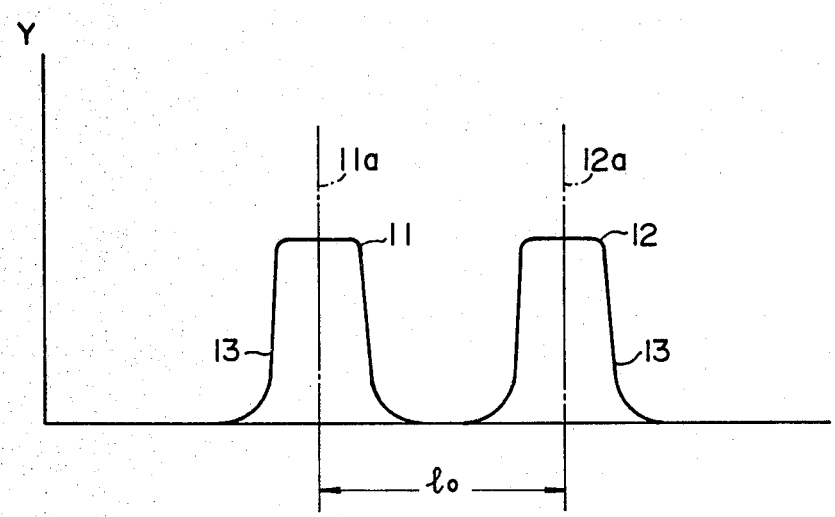
FIG. 3B is a graphic chart showing an example of the magnetized state of the magnetic marks.
Figure 4A:
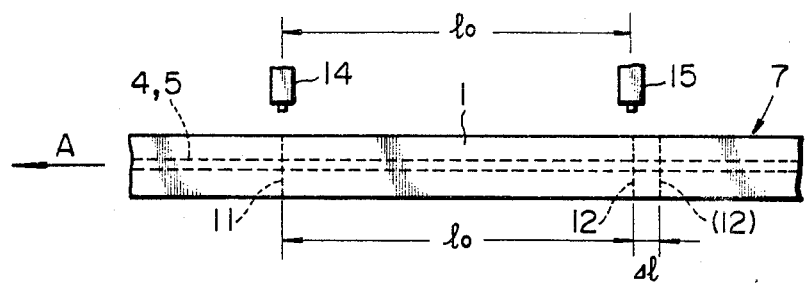
FIG. 4A is an explanatory view showing examples of the conveyor belt and the magnetic sensors.
Figure 4B:
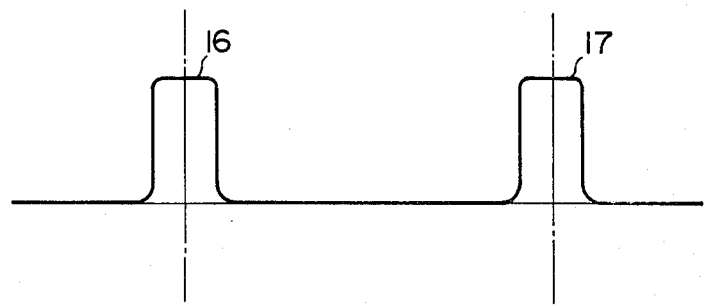
FIG. 4B is a graphic chart showing examples of signals of the magnetic marks inputted to the magnetic sensors.
Figure 4C:
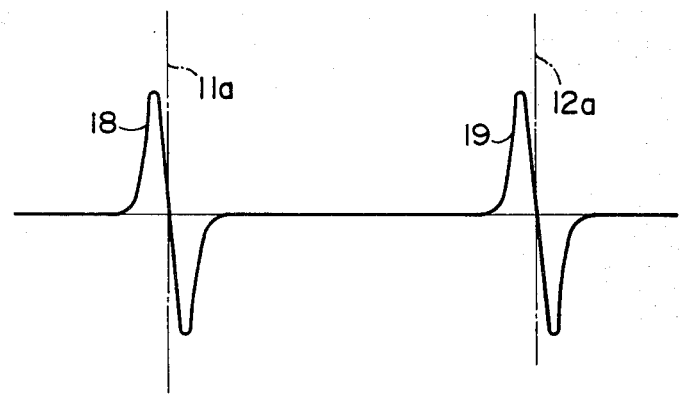
FIG. 4C is a graphic chart showing examples of method of detecting the center positions of the magnetic marks.

FIGS. 2, 3 and 4 show one embodiment of the present invention.

Initially magnetic marks are provided at two positions spaced a given distance apart from each other and on either side of the joint. More specifically, as shown in FIG. 2, a conveyor belt 7, in which the steel cord cores 4 and 5 are embedded in the rubber cover 6, is inserted between a pair of magnetic poles 9 and 10, brought into opposed relation to the magnetic poles 9 and 10, and formed with magnetic marks on the steel cord cores 4 and 5 in the widthwise directions. Thus, two magnetic marks 11 and 12 are provided at positions spaced a given distance $l_0$ apart from each other and interposing the joint 1 of the conveyor belt 7 as shown in FIG. 3A. These magnetic marks 11 and 12, as shown in FIG. 3B, are magnetized zones 13 and 13 trapezoidally distributed on center lines 11a and 12a, spaced a given distance $l_0$ apart from each other as the symmetrical axes. Designated along Y is the susceptibility.

Subsequently, two magnetic sensors spaced apart from each other by a distance identical with the distance $l_0$ across the two magnetic marks are in adjacent but non-contacting relation to the conveyor belt 7 provided thereon with the abovedescribed magnetic marks 11 and 12. More specifically, as shown FIG. 4A, designated at 14 and 15 are two magnetic sensors which are spaced apart from each other by a distance indentical with the distance $l_0$ across the two magnetic marks 11 and 12 and opposed to the conveyor belt 7 in an adjacent but non-contacting relationship therewith. The magnetic sensors 14 and 15 are connected to an operation circuit, and detection signals 16 and 17 for the magnetic marks 11 and 12 as shown in FIG. 4B are Fourier-transformed and differentially operated to be converted into differential curves 18 and 19 and the center lines 11a and 12a thereof are determined, respectively.

During operation of the conveyor belt, the running speed of the conveyor belt 7 can be measured in the following manner. As shown in FIG. 4A, the magnetic mark 11 in front in the running direction A of the conveyor belt measures a time $\Delta T$ during which it encounters the distance across the two magnetic sensors 14 and 15. The running speed V is then obtained as $l_0/\Delta T$ from the time $\Delta T$ and the distance across the magnetic sensors 14 and 15.

Next, the stretch $\Delta l$ of the joint can be measured in the following manner. If the distance $l_0$ across the magnetic marks 11 and 12 is constant, i.e., no stretch occurs in the joint, then the time at which the magnetic mark 11 of the conveyor belt reaches the magnetic sensor 14 is identical in value with the time during which the magnetic mark 12 of the conveyor belt reaches the magnetic sensor 15. If the distance $l_0$ across the magnetic marks 11 and 12 is increased to $l_0 + \Delta l$, i.e., the joint 1 is extended in length by $\Delta l$, then the time during which the magnetic mark 12 reaches the magnetic sensor 15 is delayed behind the time during which the magnetic mark 11 reaches the magnetic sensor 14, and there occurs a difference $\Delta t$ between the times during which the magnetic marks 11 and 12 reach the magnetic sensors 14 and 15, respectively. If this difference in time $\Delta t$ is multiplied by the running speed V obtained before, then the stretch $\Delta l = V \times \Delta t$ between the two magnetic marks 11 and 12, i.e., the stretch $\Delta l$ in the joint 1 can be measured.

Since the internal conditions of the joint 1 can be inferred through measuring the stretch $\Delta l$ in the joint 1, the conveyor belt 7 can be replaced with a new one before a breakage of the joint 1 and/or the projections of the steel cord cores 4 and 5 take place.

In the embodiment illustrated, the distance across the two magnetic marks 11 and 12 is selected to be identical with the distance across the two magnetic sensors 14 and 15, i.e., $l_0$, however, different distances may be desirably selected. In that case, a predetermined correction should be applied to the equation used to calculate $\Delta l$.

As has been described hereinabove, according to the present invention, two magnetic marks spaced a given distance apart from each other and interposing the joint therebetween are previously provided on the steel cord cores of the endless conveyor belt, two magnetic sensors spaced apart from each other through a distance identical with the distance across the two magnetic marks are located in adjacent but non-contacting relation with the conveyor belt, the running speed of the conveyor belt is measured from the time during which the magnetic mark in front in the running direction of the conveyor belt moves across the two magnetic sensors, a difference between the time during which the front magnetic mark of the conveyor belt reaches the front magnetic sensor and the time during which the rear magnetic mark of the conveyor belt reaches the rear magnetic sensor is measured, and the stretch in the, i.e., the stretch in the joint is measured from the aforesaid difference in time and the running speed of the conveyor belt. Hence, the stretch in the joint of the conveyor belt can be measured even during running of the conveyor belt. Furthermore, there can be offered further advantages in that the magnetic measurement makes it possible to measure a very fine value of stretch, which is difficult to obtain by visual inspection, and yet the detection of the running speed of the conveyor belt at each time of measurement makes it possible to make the measurement with high accuracy. Hence, a breakage in the joint of the endless conveyor belt and the projections of the steel cord cores can be prevented in advance thereof.

What is claimed is:

1. Method of measuring the stretch of a conveyor belt, wherein opposite ends of a belt having steel cord cores embedded therein in the longitudinal direction thereof are joined to each other, including;

previously providing magnetic marks at two positions spaced apart a given distance from each other and interposing a joint of said steel cord cores of the conveyor belt therebetween;

disposing two magnetic sensors spaced apart a given distance from each other in the running direction of said conveyor belt, in adjacent but non-contacting relation to said conveyor belt;

detecting a period of time during which either one of said two magnetic marks moves across said two magnetic sensors during running of said conveyor belt and measuring the running speed of said conveyor belt based on said period of time and a distance across said two magnetic sensors;

detecting also during running of said conveyor belt a time at which one of the magnetic marks in front in the running direction of the conveyor belt reaches one of the magnetic sensors in front in the running direction of the conveyor belt and a time at which the other of the magnetic marks in the rear in the running direction of the conveyor belt reaches the other of the magnetic sensors in the rear in the running direction of the conveyor belt, and measuring a difference in time therebetween; and calculating the value of the stretch between said magnetic marks of the conveyor belt based on said measured running speed of the conveyor belt, said measured difference in time, a ratio between the distance across said magnetic marks and the distance across said magnetic sensors.

2. Method of measuring the stretch of a conveyor belt as set forth in claim 1, wherein the distance across said two magnetic marks is selected to be identical with the distance across said two magnetic sensors.

3. Method of measuring the stretch of a conveyor belt as set forth in claim 1, wherein, in detecting the passages of said two magnetic marks by means of said two magnetic sensors, detection signals of said magnetic marks are Fourier-transformed and differentially operated to measure the center positions of the respective magnetic marks, whereby the positions of the respective magnetic marks are determined based on said center positions.

* * * * *